Aug. 11, 1964 A. B. NOMANN 3,144,102
TORQUE CONTROL FOR CONSTANT SPEED DRIVE
Filed Dec. 15, 1960 2 Sheets-Sheet 1

INVENTOR.
ARTHUR B. NOMANN
BY
George Sullivan
Agent

United States Patent Office 3,144,102
Patented Aug. 11, 1964

3,144,102
TORQUE CONTROL FOR CONSTANT
SPEED DRIVE
Arthur B. Nomann, La Habra, Calif., assignor to Lockheed Aircraft Corporation, Burbank, Calif.
Filed Dec. 15, 1960, Ser. No. 76,069
1 Claim. (Cl. 188—180)

This invention relates to a constant speed drive mechanism, and more particularly to a torque control device for maintaining a constant speed drive for instruments, such as a recorder wherein a stalled torque electric motor operates as a power source, and is governed by a clock escapement mechanism to provide constant speed for the recorder drive shaft.

Variations in the speed of electric motors, caused by fluctuations of the input voltage and variations in load characteristics are undesirable for certain instruments such as recorders, where the rotational speed of the spools must be kept constant. While many other applications are readily apparent, the invention is herein described as applicable to a recorder for illustration purposes only.

Clock escapement mechanisms have been utilized to operate as a governor to control the speed of the driven element. While the escapement provides a substantially constant speed output, the variable torque input to the escapement soon causes failure and disablement of the escapement mechanism. In addition, the power supply for the electric motor is frequently lost at a critical time when recording data is very important and, of course, the recorder is stopped by virtue of the loss of driving power.

It is therefore an object of the invention to provide a constant torque control for a drive mechanism to accurately control the rate of rotation.

Another object of the invention is to provide a source of driving power which will maintain the drive mechanism for a definite period in the event of loss of primary power.

A further object of the invention is to provide a device having a variable torque input for delivering a substantially constant output torque.

These and other objects and features of the invention will become apparent from the following description and accompanying drawings in which.

Figure 1:
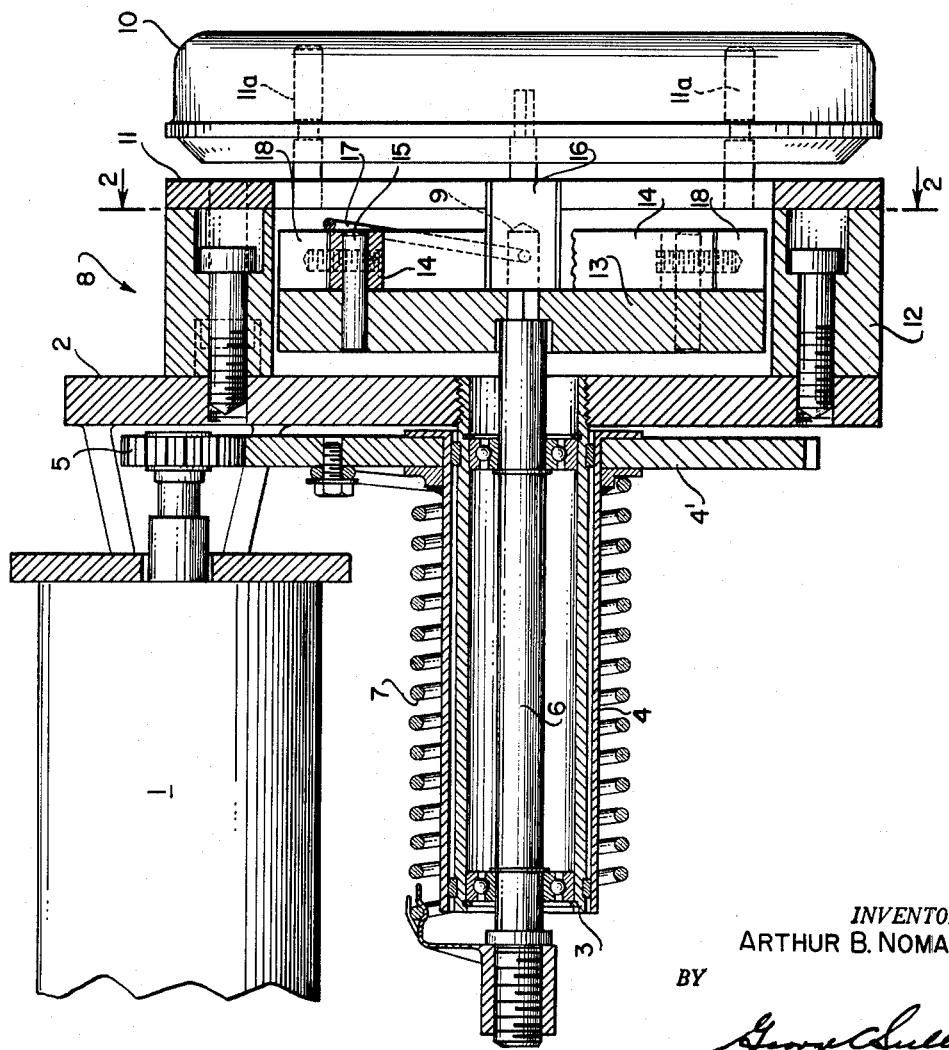
FIGURE 1 is an elevational view partly in cross section taken along the line 1—1 of FIGURE 2.

With reference to FIGURE 1, an electric motor 1 is a standard series or shunt motor, preferably a direct current motor, designed to develop a substantially constant output torque. The motor is mounted on a base plate 2, to which is fixed by welding or the like a bearing sleeve 3. A cylinder 4 having a gear 4' attached thereto is rotatably mounted on the bearing sleeve. The motor armature is keyed to gear 5 which in turn drives the larger gear 4'. A shaft 6 is coaxially mounted for free rotation by means of bearings within the sleeve 3. The helical spring 7 has one end thereof attached to the gear 4' and the other end fixed to shaft 6. The gear 4', spring 7 and shaft 6 are so arranged that the driving force of the motor is transferred from gear 4' to the spring and thence to the shaft. As will be seen, the helical spring operates as a storage device of driving force when wrapped up by the motor. A recorder or other driven device may be directly connected to shaft 6 in a conventional manner.

A torque control assembly, generally designated by numeral 8 is attached to the back of the base plate 2, and is driven by the inner end of shaft 6. A cam shaft 9 extends from the other side of the torque control assembly and is connected to a standard escapement mechanism 10. The escapement is mounted on the torque control assembly by means of the escapement plate assembly 11 and maintained in spaced relation to the plate assembly by means of the slotted pillars 11a.

Figure 2:
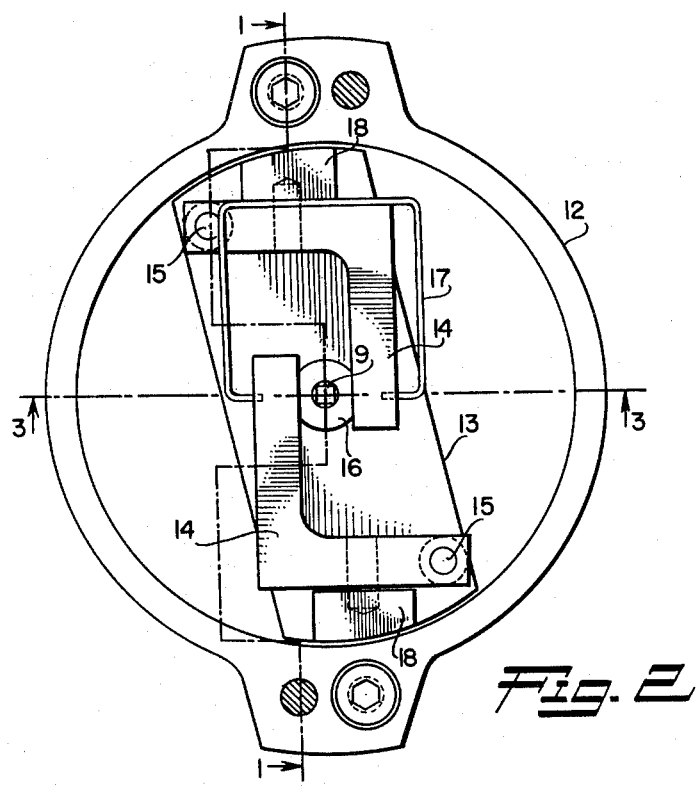
FIGURE 2 is an end view of the torque control mechanism taken along the line 2—2 of FIGURE 1.
Figure 3:
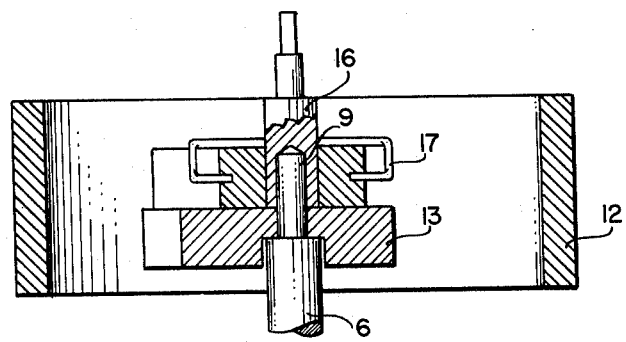
FIGURE 3 is a cross sectional view taken along the line 3—3 of FIGURE 2.

With reference to FIGURES 1 and 2, the torque control assembly 8 has a brake cylinder 12 mounted on the base plate 2. A rotor plate 13 is coupled to the shaft 6 for free rotation within the cylinder. A pair of L-shaped brake arms 14 are pivotally mounted on the rotor plate by means of dowel pins 15. A cam 16 is centered on the rotor plate between the free ends of the brake arms, and the end of the cam shaft engages a hole in the escapement 10. A spring 17 engages the sides of the brake arms, thereby maintaining the brake arms against the cam surface. A brake shoe 18 is attached to the side of the brake arm which faces the inner surface of the brake cylinder.

In operation, the electric motor 1 drives the large gear 4', through the pinion gear 5, and winds up the spring 7. The energy stored in the spring is transferred to a rotational movement of shaft 6, which in turn causes the rotor plate 13 to start rotating. Rotation of the rotor plate is transferred to the cam shaft and thence to the escapement 10, the latter operating at a substantially constant speed as is well-known.

So long as the torque is applied to the shaft 6 is substantially equal to the torque at the cam shaft as input to the escapement, the torque control is free to rotate and a direct transfer of torque takes place. However, as soon as the input torque from shaft 6 as applied to the rotor plate exceeds the torque applied to the escapement, the cam is caused to rotate relative to the rotor plate thereby spreading apart the free ends of brake arm 14, causing the brake shoes 18 to bear against the inner surface of the brake cylinder. This braking action absorbs the excess torque, and as soon as the escapement "catches up," the cam 16 rotates to such a position that the brake arms are returned to their original position by return spring 17.

Thus the amount of friction introduced by the torque control device is determined by the relative displacement between the rotor plate and the cam shaft. The brake shoes are preferably made of nylon or a similar material and for the purpose of providing a uniform friction proportional to the applied torque differential over the output torque. Undesired binding and a "grabbing" action between the shoes and cylinder is therefore avoided.

Utilization of the helical spring 7 eliminates the loss of driving torque when the electrical supply to the motor is temporarily lost, and permits the recorder or other driven element to continue running for a few minutes after a complete disruption of power. A spring pawl and ratchet (not shown) may be used to prevent the spring from unwinding through gears 4 and 5 to motor 1. In many uses of a recorder, such as flight recorder for aircraft, it is extremely important to continue recording as long as possible and particularly throughout the critical phases of a disaster. The amount of energy stored in the spring is determined by the spring dimensions and its inherent characteristics which are deemed well-known and requiring no detailed description. Also, it is apparent that means are provided to prevent a reversal of the motor and associated gearing when power is interrupted.

While a specific embodiment of the invention has been shown and described, it should be understood that certain alterations, modifications and substitutions may be made to the instant disclosure without departing from the spirit and scope of the invention as defined by the appended claim.

I claim:

A torque control device comprising a first shaft to which a variable torque is applied, a rotor plate attached to said shaft for rotation therewith, a pair of L-shaped arms each pivotally mounted at one end on said rotor plate, the free ends of said L normally lying in substantially parallel spaced relation to each other and adjacent the axis of rotation of said shaft, nylon friction surfaces attached to said arms adjacent said pivot, a cylindrical member surrounding said rotor plate and L-shaped arms and adapted to be engaged by said friction surfaces, means normally restraining said friction surfaces from contact with the cylindrical member a cam disposed between the free ends of said arms, and an output shaft integral with said cam whereby upon rotation of said cam relative to said rotor plate said friction surfaces are caused to engage said cylindrical member.

References Cited in the file of this patent

UNITED STATES PATENTS

| | | |
|---|---|---|
| 1,576,720 | Cheney | Mar. 16, 1926 |
| 2,827,135 | Sorchy | Mar. 18, 1958 |
| 2,881,873 | Movick | Apr. 14, 1959 |
| 2,942,711 | Zindler | June 28, 1960 |

FOREIGN PATENTS

| | | |
|---|---|---|
| 542,762 | Belgium | Nov. 30, 1955 |